US012670061B2

(12) United States Patent
Lin et al.

(10) Patent No.: US 12,670,061 B2
(45) Date of Patent: Jun. 30, 2026

(54) CIRCUIT ELEMENT LINK TRAINING IN A MEMORY DEVICE

(71) Applicant: Advanced Micro Devices, Inc., Santa Clara, CA (US)

(72) Inventors: David Da-Wei Lin, Westborough, MA (US); Edoardo Prete, Boxborough, MA (US); Tsun-Ho Liu, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/653,719

(22) Filed: May 2, 2024

(65) Prior Publication Data

US 2025/0103424 A1     Mar. 27, 2025

Related U.S. Application Data

(60) Provisional application No. 63/540,582, filed on Sep. 26, 2023.

(51) Int. Cl.
*G06F 11/10* (2006.01)
*H04L 1/00* (2006.01)

(52) U.S. Cl.
CPC ...... *G06F 11/1004* (2013.01); *G06F 11/1044* (2013.01); *H04L 1/0075* (2013.01)

(58) Field of Classification Search
CPC ............. G06F 11/1004; G06F 11/1008; G06F 11/1012; G06F 11/1044; H04L 1/0006;
(Continued)

(56) References Cited

U.S. PATENT DOCUMENTS 8,069,392 B1 * 11/2011 Norrie ................. H03M 13/033
                                                            714/758
10,459,785 B2 * 10/2019 Dusija ................... G06F 3/0619
(Continued)

OTHER PUBLICATIONS

GSM 05.03 version 5.2.0 Aug. 1996 https://www.etsi.org/deliver/etsi_gts/05/0503/05.02.00_60/gsmts_0503v050200p.pdf (Year: 1996).*
(Continued)

*Primary Examiner* — Joseph O Schell

(74) *Attorney, Agent, or Firm* — Patterson + Sheridan, LLP

(57)     ABSTRACT

A memory system includes a memory controller and memory circuitry. The memory controller outputs a first training signal. The memory circuitry is coupled to the memory controller. The memory circuitry includes a memory device and multiplexing data buffer circuitry. The multiplexing data buffer circuitry is coupled to the memory device. The multiplexing data buffer circuitry includes first circuitry and second circuitry. The second circuitry is coupled to the memory device. The second circuitry receives the first training signal from memory controller comprising first training data associated with the first circuitry, writes the first training data to the memory device, and read the written first training data from the memory device, and outputs the written first training data to the memory controller. The memory controller is configured to determine equalization parameters for the first circuitry based on the written first training data.

20 Claims, 4 Drawing Sheets

(58) Field of Classification Search
CPC ..... H04L 1/0009; H04L 1/001; H04L 1/0011;
H04L 1/0013; H04L 1/0015; H04L
1/0019; H04L 1/0075
See application file for complete search history.

(56) References Cited

U.S. PATENT DOCUMENTS

| | | | |
|---|---|---|---|
| 12,301,260 B1 * | 5/2025 | Ji ......................... | H03M 13/611 |
| 2002/0178421 A1 * | 11/2002 | Hassner ................ | H03M 13/15 |
| | | | 714/704 |
| 2008/0130986 A1 * | 6/2008 | Bae ........................ | G11C 29/02 |
| | | | 382/159 |
| 2014/0136927 A1 * | 5/2014 | Li ....................... | G06F 11/1016 |
| | | | 714/768 |
| 2016/0164544 A1 * | 6/2016 | Cavaliere .............. | H04L 1/0036 |
| | | | 714/774 |
| 2020/0274643 A1 * | 8/2020 | Kodaypak ............. | H04L 1/0045 |
| 2021/0343325 A1 | 11/2021 | Moon et al. | |

OTHER PUBLICATIONS

International Search Report and Written Opinion for PCT/US2024/033220 dated Sep. 12, 2024.

* cited by examiner

300

| | A | B | C | D | E | F | G | H | J | K | L | M | N | P | R |
|---|---|---|---|---|---|---|---|---|---|---|---|---|---|---|---|
| 6 | A_MDQ7 | A_MDQ5 | A_MDQ6 | A_MDQ4 | A_MD-QS1_t | A_MD-QS1_c | | BCOM1 | | A_MD-QS0_t | A_MD-QS0_c | A_MDQ3 | A_MDQ1 | A_MDQ2 | A_MDQ0 |
| 5 | VSS | VSS | VSS | VSS | B_MD-QS1_t | B_MD-QS1_c | BCOM0 | VSS | BCOM2 | B_MD-QS0_t | B_MD-QS0_c | VSS | VSS | VSS | VSS |
| 4 | B_MDQ7 | B_MDQ5 | B_MDQ6 | B_MDQ4 | VSS | | | | VSS | | VSS | B_MDQ3 | B_MDQ1 | B_MDQ2 | B_MDQ0 |
| 3 | ZQCAL | VDD | | VDD | VSS | VDD | VSS | VDD | VSS | VDD | | VDD | | VDD | BRST_n |
| 2 | VSS | DQ5 | VSS | DQ4 | VSS | VSS | IBCS_n | BCK_t | LBTXDQ | VSS | VSS | DQ3 | VSS | DQ2 | VSS |
| 1 | DQ7 | VSS | DQ6 | VSS | $CRC_1$ | $CRC_2$ | | BCK_c | LBTX-DQS | DQS0_c | DQS0_t | VSS | DQ1 | VSS | DQ0 |

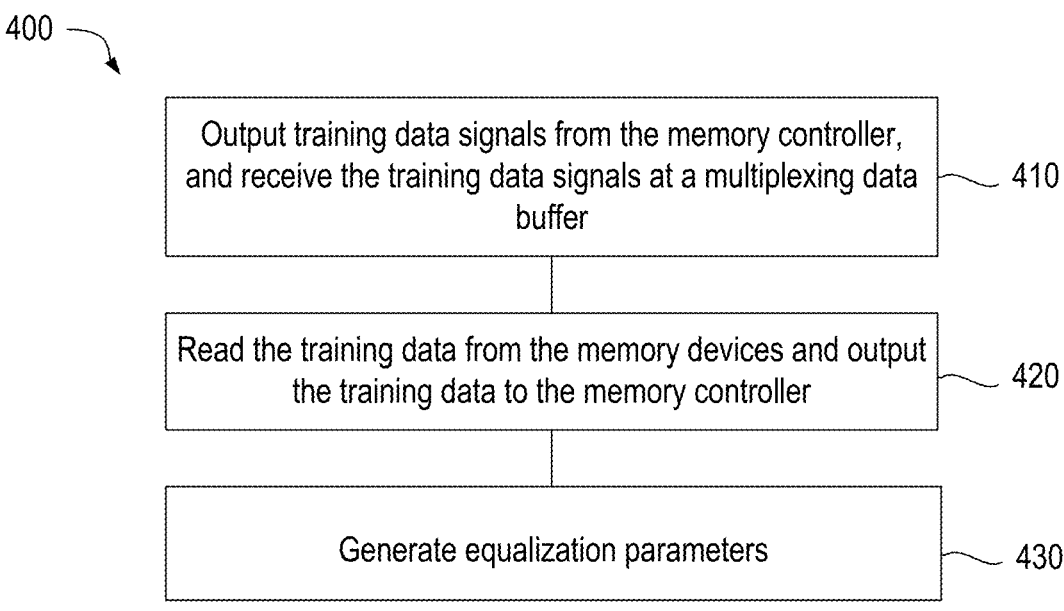

Output training data signals from the memory controller, and receive the training data signals at a multiplexing data buffer — 410

Read the training data from the memory devices and output the training data to the memory controller — 420

Generate equalization parameters — 430

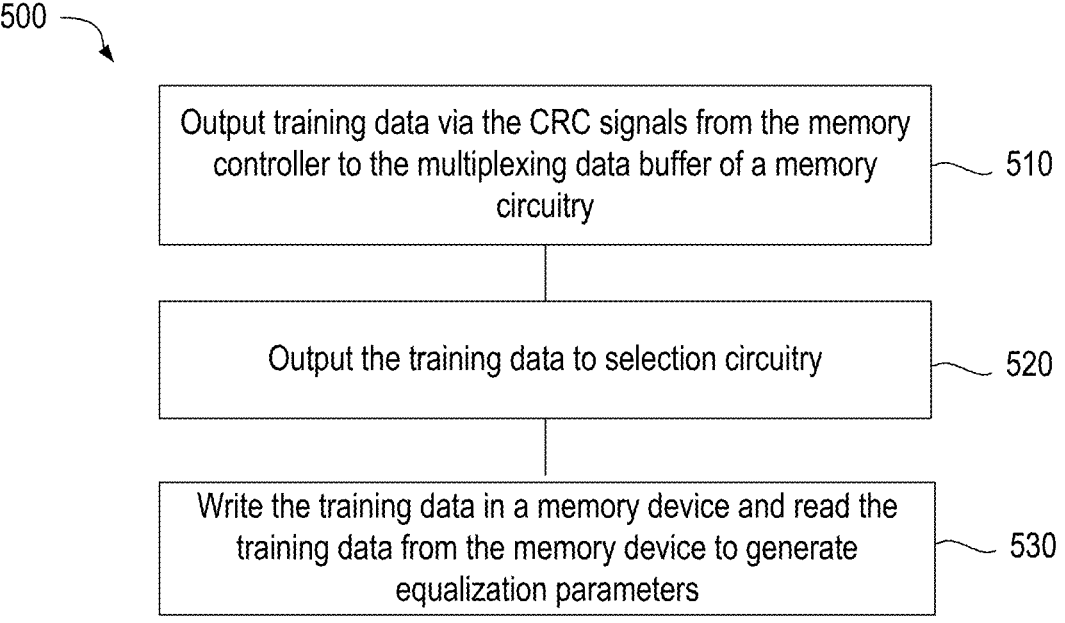

Output training data via the CRC signals from the memory controller to the multiplexing data buffer of a memory circuitry — 510

Output the training data to selection circuitry — 520

Write the training data in a memory device and read the training data from the memory device to generate equalization parameters — 530

FIG. 5

CIRCUIT ELEMENT LINK TRAINING IN A MEMORY DEVICE

CROSS-REFERENCE TO RELATED APPLICATIONS

This application claims priority to the U.S. Provisional Patent Application Ser. No. 63/540,582, filed Sep. 26, 2023, which is incorporated herein by reference in its entirety.

TECHNICAL FIELD

Examples of the present disclosure generally relate to training interfaces between a memory circuitry and a memory device to mitigate errors within corresponding transmitted signals.

BACKGROUND

Memory circuitries are coupled with and controlled by memory controllers. The memory circuitries include memory devices that store data. Signals are transmitted between the memory controllers and the memory circuitries to write data to the memory devices of the memory circuitries and to read data from the memory devices of the memory circuitries. A memory circuitry is coupled to a memory controller via one or more interfaces. Training is used to mitigate errors within the signals transmitted between the memory controller and the memory circuitry. During training, training signals are communicated between the memory circuitry and the memory controller to determine equalization parameters. During operation, the equalization parameters are applied to the data and control signals transmitted between the memory circuitry and a corresponding memory controller to mitigate errors that may be present within the data and control signals.

SUMMARY

In one example, a memory circuitry includes a memory device and multiplexing data buffer circuitry coupled to the memory device. The multiplexing data buffer circuitry includes first circuitry and second circuitry. The second circuitry is coupled to the memory device. The second circuitry receives a first signal comprising first training data associated with the first circuitry, writes the first training data to the memory device, and reads the written first training data from the memory device. The written first training data is used to determine equalization parameters for the first circuitry.

In one example, the memory system includes a memory controller and memory circuitry. The memory controller outputs a first training signal. The memory circuitry is coupled to the memory controller. The memory circuitry includes a memory device and multiplexing data buffer circuitry. The multiplexing data buffer circuitry is coupled to the memory device. The multiplexing data buffer circuitry includes first circuitry and second circuitry. The second circuitry is coupled to the memory device. The second circuitry receives the first training signal from memory controller comprising first training data associated with the first circuitry, writes the first training data to the memory device, and read the written first training data from the memory device, and outputs the written first training data to the memory controller. The memory controller is configured to determine equalization parameters for the first circuitry based on the written first training data.

In one example, a method includes receiving, at first circuitry of multiplexing data buffer circuitry of memory circuitry, a first signal including first training data associated with second circuitry of the multiplexing data buffer circuitry. Further, the method includes writing, via the first circuitry, the first training data to a memory device of the memory circuitry. The method further includes reading, via the first circuitry, the written first training data from the memory device, and determining equalization parameters for the second circuitry from the written first training data.

These and other aspects may be understood with reference to the following detailed description

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 illustrates a layout connection configuration of memory circuitry.

FIG. 4 illustrates a flowchart of a method for training a multiplexing data buffer.

FIG. 5 illustrates a flowchart of a method for training a circuit element of a cyclic redundancy check circuitry via selection circuitry.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
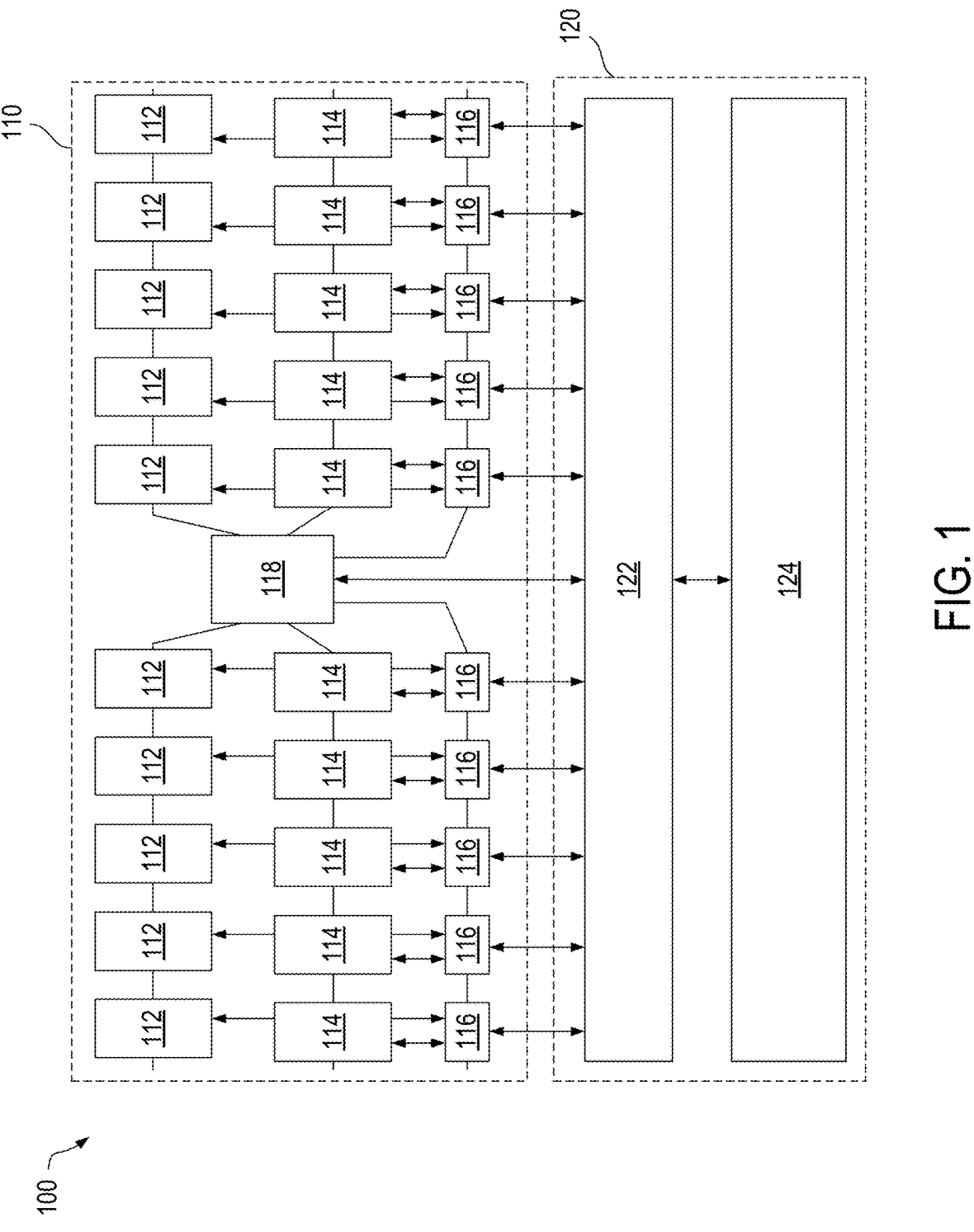
FIG. 1 illustrates a block diagram of a memory system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Memory circuitry includes one or more memory devices. The memory devices are used to store data within the memory circuitry. In one example, the memory devices of a memory circuitry are disposed in rows. A pair of memory devices, e.g., a memory device from each row, is coupled to a common multiplexing data buffer of the memory circuitry. The multiplexing data buffers control the flow of signals (e.g., command signals and data signals, among other) to and from the respective memory devices.

A memory circuitry is coupled to a memory controller. The memory controller outputs control signals and data signals to the memory circuitry to write data to the memory devices and read data from the memory devices via write and read commands. The memory controller is coupled to the multiplexing data buffers of the corresponding memory circuitry. The signals output from a memory controller are received the multiplexing data buffers and routed to a corresponding memory device. Further signals are routed from the memory devices to the memory controller via the multiplexing data buffers.

A training process is used to mitigate errors that may exist in the signals transmitted between the memory circuitry and memory controller due to differences in the properties (e.g., physical and/or electrical) of the interconnects (e.g., wires and/or traces) and the circuit elements coupling a memory controller with a memory circuitry. The training process transmits training data from the memory controller to the memory circuitry, and then back to the memory controller to determine equalization parameters. Equalization parameters are generated for each connection between the memory controller and the memory circuitry, and for write commands and read commands.

A multiplexing data buffer includes cyclic redundancy check (CRC) circuitry, selection circuitries, and buffers (e.g., buffer circuitries). A training process determines equalization parameters for the selection circuitries and buffers. However, as the CRC circuitry may not have access to (e.g., not coupled with) a memory device. Accordingly, training data sent the CRC circuitry is note able to be stored (e.g., written to a memory device), and the CRC circuitry and corresponding interconnects may not be trained. In the following, the CRC circuitry is coupled to a memory device, or devices, via a selection circuitry. Training data communicated to the CRC circuitry can be written to and read from a memory device via a selection circuitry, and the CRC circuitry and corresponding interface may be trained and generated equalization parameters. Accordingly, errors that may occur when communicating with the CRC circuitry may be mitigated, improving the performance of the corresponding memory circuitry and memory controller.

FIG. 1 illustrates a memory system 100 including a memory circuitry 110 coupled with host circuitry 120. The host circuitry 120 includes a memory controller 122 and a processing device 124. The processing device 124 is a central processing unit (CPU) or a graphics processing unit (GPU), among others.

The memory circuitry 110 is a synchronous dynamic random-access memory (SRAM). In one or more examples, the memory circuitry 110 is a double data rate (DDR) SRAM, or other type of SRAM. In one or more examples, the memory circuitry 110 is first, second, third, fourth, or fifth, among other, generation DDR (e.g., DDR1, DDR2, DDR3, DDR4, or DDR5). In other examples, the memory circuitry 110 is another type of memory. The memory circuitry 110 is packaged as a module. For example, the memory circuitry 110 is packaged as a Dual In-line memory Module (DIMM). In one or more examples, the memory circuitry 110 is packaged as a multi-ranked buffered (MR) DIMMs.

The memory circuitry 110 includes memory devices 112 and 114, multiplexing data buffers (e.g., multiplexing data buffer circuitry) 116, and multiplexing registered clock driver (MRCD) circuitry 118. The memory devices 112 and 114 may be random access memory (RAM). For example, the memory devices 112 and 114 are dynamic RAM (DRAM).

The memory devices 112 and 114 store data bits. The memory devices 112 and 114 are coupled to the multiplexing data buffers 116. In one example, pairs of the memory devices 112 and 114 are coupled to a respective multiplexing data buffer 116. In other examples, the memory devices 112 and 114 are coupled to the multiplexing data buffers 116 in other configurations.

The multiplexing data buffers 116 control the communication of control signals, and/or data signals to the memory devices 112 and 114. The MRCD circuitry 118 buffers the control signals (e.g., command address signals, chip select signals, and clock signals, among others) received from the memory controller 122. The MRCD circuitry 118 outputs the buffered signals to the multiplexing data buffers 116 and the memory devices 112 and 114.

The memory controller 122 communicates the controls signals and the data signals to the memory circuitry 110. The processing device 124 provides (e.g., outputs) data signals to the memory controller 122. The memory controller 122 generates the control signals (e.g., command address signals, chip select signals, and clock signals, among others) for the data signals, and outputs the control signals and the data signals to the memory circuitry 110.

In one example, the memory devices 112 and 114 are disposed on a PCB having a first side and a second side, or a front side and a back side (e.g., two opposite sides) of PCB. In such an example, a first group the memory devices 112 and 114 are disposed on the first side and a second group of the memory devices 112 and 114 are dispose the second side. For example, the memory devices 112 are disposed on a first side and the memory devices 114 are disposed on a second side. Such a configuration may be referred to a DIMM.

Figure 2:
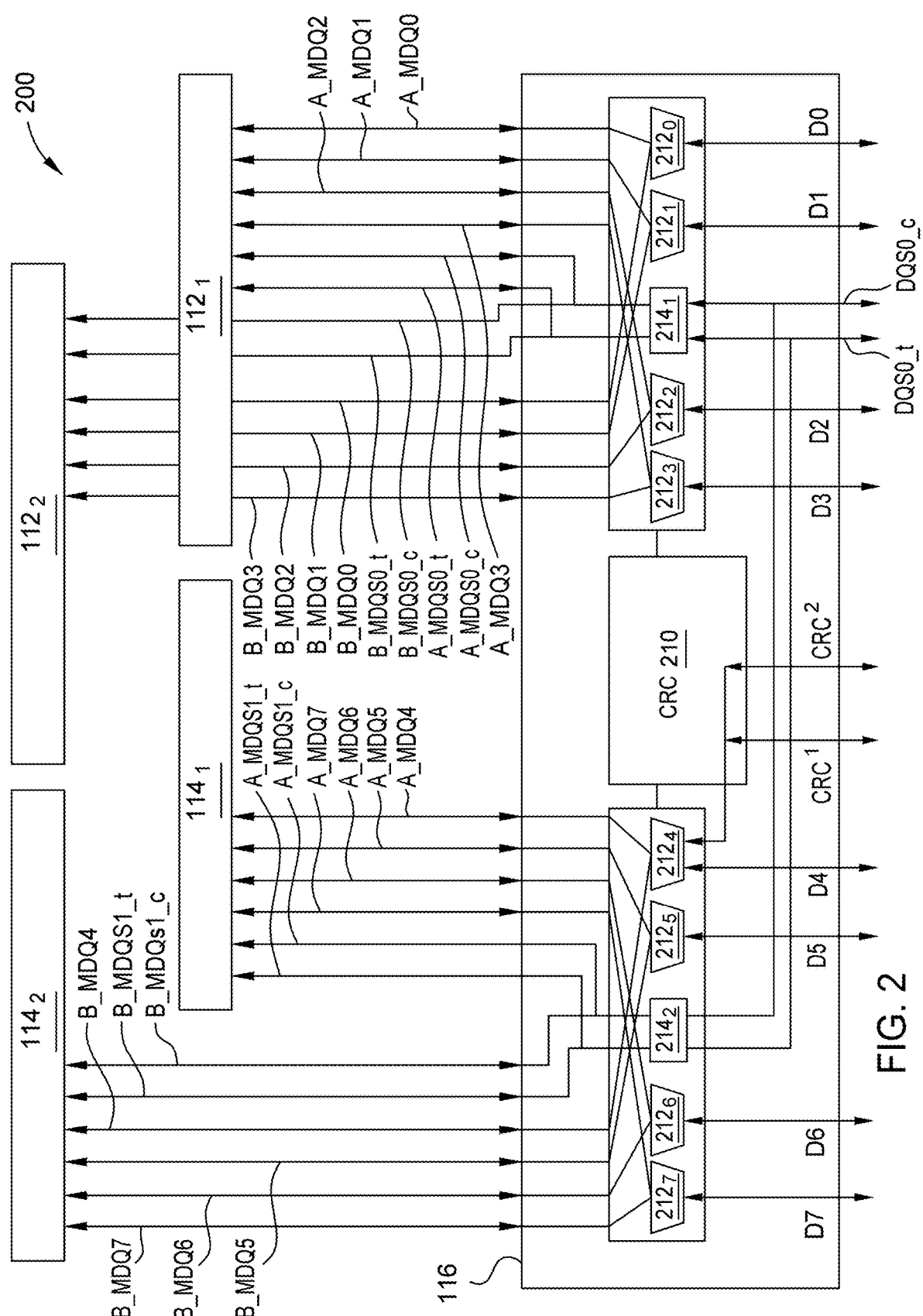
FIG. 2 illustrates a block diagram of memory circuitry.

FIG. 2 illustrates an example multiplexing data buffer 116 coupled to the memory devices $112_1$, $112_2$, $114_1$, and $114_2$. The memory devices $112_1$ and $114_1$ correspond to a first channel and the memory devices $112_2$ and $114_2$ correspond to a second channel.

The multiplexing data buffer 116 includes CRC circuitry 210, selection circuitries 212 and buffers (e.g., buffer circuitries) 214. In one example, the selection circuitries 212 function as de-multiplexers when receiving data signals from a memory controller (e.g., the write direction) to output data signals to a corresponding memory device 112 or 114, and as multiplexers when receiving data signals from the memory devices 112 and 114 (e.g., the read direction) to route data signals from a corresponding memory device 112 or 114 to a memory controller. The CRC circuitry 210 uses a CRC code transmitted via the signals $CRC_1$ and $CRC_2$ to detect errors within data stored within (e.g., written to) the memory devices 112 and 114. In one example, the $CRC_1$ and $CRC_2$ signals are transmitted via connections that were previously used to transmit data strobe signals DQS1_$t$ and DQS1_$c$ in other examples. For example, the CRC circuitry 210 determines a check sum based on a received code, and uses the check sum to validate data during a write operation before data is stored within the memory devices 112 and 114. The CRC circuitry 210 communicates any detected errors to the memory controller 122. Further, the CRC circuitry 210 is configured to receive the signals $CRC_1$ and $CRC_2$ via respective input/output pins in the multiplexing data buffer 116. The input/output pins are bi-directional pins.

The selection circuitries 212 receive a respective data signal (e.g., D0-D7), and outputs the data signal to the memory devices 112 and 114 during write operation. In one example, each selection circuitry 212 is connected to a respective input/output pin of the multiplexing data buffer 116, and receives and outputs a respective data signal (e.g., D0-D7) via the respective input/output pin. The input/output pins are bi-directional pins.

Each of the selection circuitries 212 receives a respective data signal and outputs a data signal to one of the memory device 112 or the memory device 114. In one example, the selection circuitries $212_0$-$212_3$ are connected to the memory devices $112_1$ and $112_2$, and output data signals MDQ0-MDQ3 to the memory devices $112_1$ and $112_2$. The de-multiplexers $212_4$-$212_7$ are connected to the memory devices $114_1$ and $114_2$, and output data signals MDQ4-MDQ7 to the memory devices $114_1$ and $114_2$.

The buffers $214_1$ and $214_2$ receive the data strobe signals DQS0_$t$ and DQS0_$c$. The DQS0_$c$ signal is the compliment of the DQS0_$t$ signal. The data strobe signals act as a clock for the data lines within the memory device. In one example, the data strobe signals are used to compensate for delay between a data path and a clock signal. The DQS0_$c$ and DQS0_$t$ signals are output to the memory devices 112 and 114 as A_MDQS0_$t$, A_MDQS0_$c$, B_MDQS0_$t$, B_MDQS0_$c$, AMDQS1_$t$, A_MDQS1_$c$, B_MDQS1_$t$, and B_MDQS1_$c$ signals from the buffers $214_1$ and $214_2$, respectively. In one example, the buffers $214_1$ and $214_2$ are connected to a pair of input/input output pins of multiplexing data buffer 116 that are used to communicate the DQS0_$t$ and DQS0_$c$ signals. The input/output pins are bi-directional pins.

The CRC circuitry 210 is coupled to one or more of the memory devices 112 and/or 114 via one or more of the selection circuitries 212. For example, as illustrated in FIG. 2, the CRC circuitry 210 accesses the memory devices $114_1$ and $114_2$ via the selection circuitry $212_4$. However, in other examples, the CRC circuitry 210 accesses the memory devices 112 and/or 114 via a different one of the selection circuitries 212.

In one example, the CRC circuitry 210 includes pass-through circuitry, or other circuit elements, that output the training data to the selection circuitry $212_4$. In one example, circuitry external to the CRC circuitry 210 receives and communicates the training data to the selection circuitry $212_4$. In one example, the input to the selection circuitry $212_4$ is connected to switching circuitry or selection circuitry that selectively connects the $CRC_1$ and $CRC_2$ signals or the data signal D4 to the input of the selection circuitry $212_4$.

FIG. 3 illustrates table 300 indicating the ball assignments (e.g., layout connection configuration) associated with the selection circuitries 212, the buffers 214, and the CRC circuitry 210 of FIG. 2. As can be seen by highlighted portion 310, the input/output pin for D4 is disposed proximate to the input/output pin for the signals $CRC_1$ and $CRC_2$. Accordingly, the selection circuitry $212_4$ that is associated with the input/output pin for D4 is selected and used during training of the CRC circuitry 210. Selecting an input/output pin and corresponding selection circuitry 212 that is proximate to (e.g., the closest to or within a threshold distance) the input/output pin(s) of the CRC circuitry 210 reduces the routing length between the CRC circuitry 210 and the selected selection circuitry 212, mitigating errors that may arise due to latency and/or other traffic within the multiplexing data buffer 116. In one example, the selection circuitry that is used during training of a CRC circuitry within a first multiplexing data buffer differs from the selection circuitry that is used during training of a CRC circuitry within at least a second multiplexing data buffer. In one example, the selection circuitry that is used during training of a CRC circuitry within at least two multiplexing data buffer is the same. In one example, buffers 214 may be used instead of the selection circuitry 212 during the training of the CRC circuitry 210 by communicating the training data with the memory devices 112 and/114. In such an example, the buffers 214 are selected as described above with regard to the selection circuitry 212.

In one example, training is applied to the multiplexing data buffer 116 to determine equalization parameters for data being sent to and from the multiplexing data buffer 116. The training is performed within the memory controller 122, or a processing device connected to the memory controller 122, based on data received from the multiplexing data buffer 116. Further, training is performed within the memory controller 122 based on data signals and/or control signals received by the multiplexing data buffer 116. FIG. 4 illustrates a flowchart of a method 400 for training a multiplexing data buffer. The method 400 is performed by the memory controller 122 and/or a processing device of the memory controller 122 as is described above.

At 410, training data signals are output from the memory controller 122 and are received by the multiplexing data buffer 116. In one example, the training data signals (e.g., D0-D7) are received by the multiplexing data buffer 116 from the memory controller 122. The training data associated within the training data signals is stored within (e.g., written to) the corresponding memory devices 112 and 114. The training data signals may be pseudorandom binary sequence (PRBS) signals or linear feedback shift register (LSFR) signals, among others.

At 420, the training data is read from memory devices and output to the memory controller 122. The stored training data is accessed (read) by the memory controller 122 from the memory devices 112 and/or 114. For example, the memory controller 122 may issue a read command to read the training data from the memory devices 112 and/or 114. The read training data is output from the memory circuitry 110 to the memory controller 122 as a data signal or signals.

At 430, equalization parameters are determined. In one example, the memory controller 122 receives the data signals containing the stored training data to determine if errors exist within the stored training data. For example, the stored training data is compared to the output training data from the memory controller 122 to determine if differences exist in the stored training data. Any differences between the training data output in the training data signals from the memory controller 122 may be corresponding to error in the stored training data. Equalization parameters are determined through the iterative process loops of writing data from the memory controller 122 to the memory device 112 and 114, reading data from the memory device circuitries to the memory controller 122, and comparing the data the written with the read data to determine if errors are found. Equalization parameters are generated to offset (e.g., mitigate) the errors. In one or more examples, the equalization parameters are determined and applied to write data (e.g., write equalization) and/or read data (e.g., reading equalization)

The equalization parameters are stored within registers of the multiplexing data buffer 116 for the write operation and within registers of the memory controller 122 for the read operation. In one example, each selection circuitry 212 is trained to determine respective equalization parameters (e.g., write equalization parameters and/or read equalization parameters) as is described with regard to method 400. For example, to perform training with regard to the selection circuitry $212_2$, the data signal DO is received and stored within the memory devices $112_1$ and/or $112_2$. The stored data is accessed (read) and compared with the written data to determine the equalization parameters. As is described above, such a process is iterative. In one example, the stored data is communicated to the memory controller 122, and training is performed within the memory controller 122, or the processing device 124, to determine the corresponding equalization parameters for each selection circuitry 212 within the memory controller 122, or the processing device 124. Similar training processes as described with regard to the method 400 are applied to the buffers 214₁ and 214₂, as the buffers 214₁ and 214₂ have access to the memory devices 112 and 114. For example, data is transmitted to each of the buffers 214 via the respective input/output pins, and stored within the respective memory devices 112 and 114. The stored data is read and used to determine the equalization parameters for each of the buffers 214. Further, the stored data may be communicated to the host circuitry 120 to determine equalization parameters as described above for the buffers 214.

FIG. 5 illustrates a flowchart of a method 500 for training CRC circuitry (e.g., the CRC circuitry 210) of a multiplexing data buffer (e.g., the multiplexing data buffer 116). In one example, the method 500 is performed subsequent to or before the completion or of the method 400 of FIG. 4. While the method 500 is described with regard to training the CRC circuity, in other examples, the method 500 may be applied to other circuit elements. As such, CRC circuitry in the following may be replaced with first circuitry, which corresponds to a circuit element within the multiplexing data buffer 116 that is not directly connected to with a memory device of a corresponding memory circuitry.

At 510, training data is output as a training data signal (e.g., a CRC signal) from a memory controller to CRC circuitry of a multiplexing data buffer of a memory circuitry. With reference to FIG. 2, to train the CRC circuitry 210, training data (e.g., a PRBS, LSFR patterns, or other data patterns) is provided via training data signals (e.g., signals CRC₁ and CRC₂) and respective input/output pins of the multiplexing data buffer 116.

At 520, the training data is output to the selection circuitry 212. For example with reference to FIG. 2, the training data is output to the selection circuitry 212₄ from the CRC circuitry 210 (e.g., via internal bypass circuitry or pass-through circuitry) or by circuitry external to the CRC circuitry 210.

At 530, the training data is stored in a memory device and read from the memory device to generate equalization parameters. For example with reference to FIG. 2, the selection circuitry 212₄ outputs the training data to the memory devices 114₁ and/or 114₂ to store the training data in the memory devices 114₁ and/or 114₂. In one example, the stored training data is read and compared to the written training data to determine the equalization parameters for the CRC circuitry 210 as is described above with regard to the method 400. The equalization parameters are stored within registers within the multiplexing data buffer 116. Further, the stored training data is communicated to the host circuitry 120, and used by the memory controller 122 and/or the processing device 124 to determine equalization parameters for the CRC circuitry 210. The equalization parameters are stored within a memory associated with the memory controller 122 and/or the processing device 124.

While the above is described with regard to using (sharing) a selection circuitry 212 during the training of the CRC circuitry 210 to provide the CRC circuitry 210 access to the memory devices 112 and 114, the above may be used in the training of other circuit elements within a multiplexing data buffer 116 (or other type of buffer circuitry) that do not have direct access to the memory circuitries, and that are used to receive and/or output signals from the multiplexing data buffer 116. In one example, the training data signals provided to such a circuit element are re-routed to a circuit element with access to the memory circuitries to store and read the training data from the memory circuitries as described above with regard to the method 500.

In one example, a training process as is described with regard to the method 400 of FIG. 4 is applied to the selection circuitries 212 and/or the buffers 214 during a first period. During a second period, the training process as is described with regard to the method 500 of FIG. 5 is applied to the CRC circuitry 210. The first period and the second period are non-overlapping. In one example, the second period occurs subsequent to the first period. In one or more examples, the training process as is described with regard to the method 400 of FIG. 4 and/or the method 500 of FIG. 5 is applied at boot-up of the corresponding memory circuitry 110, at power-on of the memory circuitry 110, after restart of the memory circuitry 110, based on a control signal received from the host circuitry 120, and/or after a period of time, among others.

In one example, the selection circuitry 212 used during the training process of the CRC circuitry 210 is determined during design of the corresponding memory circuitry. The selection circuitry 212 may be determined via an electronic design system (EDA system), or another computer system, used during the design of the memory circuitry 110. For example, with reference to FIG. 1, the connection configurations (e.g., layouts) of the memory devices 112 and 114, the multiplexing data buffers 116, and the MRCD circuitry 118 are used to determine which of the selection circuitry 212 is used during the training process of the CRC circuitry 210. In one example, each of the selection circuitries 212, the buffers 214, and the CRC circuitry 210 is connected to a substrate via connection elements (e.g., solder balls or bumps, or other types of connection elements). The layout of the connection elements is used to determine which selection circuitry 212 is used during the training process of the CRC circuitry 210. For example, the layout of the connection elements is analyzed (e.g., by an EDA system, another computer system, by a designer, or with the assistance of a designer) to determine which selection circuitry 212 is positioned proximate to the CRC circuitry 210. A selection circuitry 212 that is positioned proximate to the CRC circuitry 210 is selected and used during training of the CRC circuitry 210 (e.g., controls the communication of training data from the CRC circuitry 210 to and from the memory devices 112 and/or 114). In one example, the selection circuitry 212 that is positioned closer to the CRC circuitry 210 than the other selection circuitries 212 is selected. In other examples, a selection circuitry 212 having connections elements that are positioned less than or equal to a threshold distance from the connection elements of the CRC circuitry 210 may be selected and used during training of the CRC circuitry 210. In one example, a designer (or user) selects the selection circuitry 212 that is to be used to train the CRC circuitry 210.

While the foregoing is directed to specific examples, other and further examples may be devised without departing from the basic scope thereof, and the scope thereof is determined by the claims that follow.

What is claimed is:

1. A memory circuitry comprising:
   memory devices; and
   multiplexing data buffer circuitry coupled to the memory devices, the multiplexing data buffer circuitry comprising:
   input/output pins;
   first circuitry coupled to a first input/output pin of the input/output pins; and second circuitries, wherein the second circuitries are coupled to the memory devices and a first one the second circuitries is configured to:

receive, during a first period, a first signal comprising first training data associated with the first circuitry, write the first training data to a first memory device of the memory devices, and read the written first training data from the first memory device, wherein the written first training data is used to determine equalization parameters for the first circuitry and the first signal is received via the first input/output pin; and receive, during a second period non-overlapping with the first period, a second signal comprising second training data and write the second training data to the first memory device, wherein the written second training data is used to determine equalization parameters for the first one of the second circuitries, the second signal is received via a second input/output pin of the input/output pins.

2. The memory circuitry of claim 1, wherein the first one of the second circuitries is further configured to read the written second training data from the first memory device.

3. The memory circuitry of claim 1, wherein the first circuitry comprises pass-through circuitry configured to receive the first signal and output the first signal to the first one of the second circuitries.

4. The memory circuitry of claim 1, wherein the multiplexing data buffer circuitry further comprises third circuitry external to the first circuitry and configured to receive the first signal and output the first signal to the first one of the second circuitries.

5. The memory circuitry of claim 1, wherein the first circuitry is cyclic redundancy check circuitry.

6. The memory circuitry of claim 1, wherein the first one of the second circuitries is one of selection circuitry and buffer circuitry.

7. The memory circuitry of claim 1, wherein the first circuitry and the second circuitries are disposed on a substrate.

8. The memory circuitry of claim 1, wherein a routing length between the first circuitry and the first one of the second circuitries is less than a routing length between the first circuitry and each other of the second circuitries.

9. The memory circuitry of claim 1, wherein the memory circuitry is packaged as a dual in-line memory module.

10. A memory system comprising:

a memory controller configured to output a first training signal and a second training signal; and memory circuitry coupled to the memory controller and comprising:

memory devices; and multiplexing data buffer circuitry coupled to the memory devices, the multiplexing data buffer circuitry comprising:

input/output pins;

first circuitry coupled to a first input/output pin of the input/output pins; and second circuitries, wherein the second circuitries are coupled to the memory devices and a first one of the second circuitries is configured to:

receive, during a first period and via the first input/output pin, the first training signal from the memory controller comprising first training data associated with the first circuitry, write the first training data to a first memory device of the memory devices, and read the written first training data from the first memory device;

output the written first training data to the memory controller;

receive, during a second period non-overlapping with the first period and via a second input/output pin of the input/output pins, a second signal comprising second training data and write the second training data to the first memory device; and output the written second training data to the memory controller, wherein the memory controller is configured to determine first equalization parameters for the first circuitry based on the written first training data and second equalization parameters for the first one of the second circuitries based on the written second training data.

11. The memory system of claim 10, wherein the first one of the second circuitries is further configured read the written second training data from the first memory device.

12. The memory system of claim 10, wherein the first circuitry comprises pass-through circuitry configured to receive the first training signal and output the first training signal to the first one of the second circuitries.

13. The memory system of claim 10, wherein the multiplexing data buffer circuitry further comprises third circuitry external to the first circuitry and configured to receive the first training signal and output the first training signal to the first one of the second circuitries.

14. The memory system of claim 10, wherein the first circuitry is cyclic redundancy check circuitry.

15. The memory system of claim 10, wherein the first one of the second circuitries is one of selection circuitry and buffer circuitry.

16. A method comprising:

receiving, during a first period and at first circuitry of multiplexing data buffer circuitry of memory circuitry, a first signal comprising first training data associated with second circuitry of the multiplexing data buffer circuitry, wherein the first signal is received via a first input/output pins of input/output pins of the multiplexing data buffer circuitry;

writing, via the first circuitry and during the first period, the first training data to a first memory device of memory devices of the memory circuitry;

reading, via the first circuitry and during the first period, the written first training data from the first memory device;

receiving, during a second period and at the first circuitry, a second signal comprising second training data associated with the first circuitry, wherein the second signal is received via a second input/output pin of the input/output pins, wherein the first period and the second period are non-overlapping;

writing, via the first circuitry and during the second period, the second training data to the first memory device; and determining equalization parameters for the second circuitry from the written first training data and equalization parameters for the first circuitry from the written second training data.

17. The method of claim 16 further comprising:

reading, via the first circuitry, the written second training data from the first memory device.

18. The method of claim 16, wherein at least one of the first signal is received by the first circuitry from the second circuitry via pass-through circuitry of the first circuitry and the first signal is received by the first circuitry from third circuitry external to the second circuitry.

19. The method of claim 16, wherein the first circuitry is cyclic redundancy check circuitry.

20. The method of claim 16, wherein the second circuitry is one of selection circuitry and buffer circuitry.

* * * * *